United States Patent
Namikawa et al.

(10) Patent No.: US 10,718,892 B2
(45) Date of Patent: Jul. 21, 2020

(54) BACKLIGHT UNIT AND LIQUID CRYSTAL DISPLAY DEVICE

(71) Applicant: KEIWA Inc., Tokyo (JP)

(72) Inventors: Yoshitada Namikawa, Tokyo (JP); Hirohisa Dejima, Tokyo (JP)

(73) Assignee: KEIWA Inc., Tokyo (JP)

( * ) Notice: Subject to any disclaimer, the term of this patent is extended or adjusted under 35 U.S.C. 154(b) by 0 days.

(21) Appl. No.: 16/657,679

(22) Filed: Oct. 18, 2019

(65) Prior Publication Data

US 2020/0124784 A1 Apr. 23, 2020

(30) Foreign Application Priority Data

Oct. 18, 2018 (JP) .................................. 2018-196838

(51) Int. Cl.
*F21V 8/00* (2006.01)

(52) U.S. Cl.
CPC ........... *G02B 6/0051* (2013.01); *G02B 6/009* (2013.01); *G02B 6/0053* (2013.01); *G02B 6/0088* (2013.01); *G02B 6/0055* (2013.01)

(58) Field of Classification Search
CPC .. G02B 6/0051; G02B 6/0053; G02B 6/0088; G02B 6/009
USPC ....................................................... 362/607
See application file for complete search history.

(56) References Cited

U.S. PATENT DOCUMENTS

| | | | | |
|---|---|---|---|---|
| 6,055,029 A | * | 4/2000 | Kurihara | G02B 6/0088 349/65 |
| 2001/0030859 A1 | * | 10/2001 | Fukuyoshi | G02B 6/0081 362/629 |
| 2004/0228141 A1 | * | 11/2004 | Hay | G02B 5/0268 362/555 |
| 2007/0103910 A1 | * | 5/2007 | Brickey | G02B 5/0242 362/311.04 |
| 2009/0040772 A1 | * | 2/2009 | Laney | G02B 5/0278 362/353 |
| 2012/0268951 A1 | * | 10/2012 | Li | G02F 1/133608 362/353 |
| 2017/0299804 A1 | * | 10/2017 | Sun | G02B 6/0055 |
| 2018/0292600 A1 | * | 10/2018 | Lee | G02B 6/0056 |

FOREIGN PATENT DOCUMENTS

JP 2017-187548 A 10/2017

* cited by examiner

*Primary Examiner* — Byron T Gyllstrom
(74) *Attorney, Agent, or Firm* — Knobbe, Martens, Olson & Bear, LLP

(57) ABSTRACT

A backlight unit satisfies the relationship given by the following expression: $S<2(A-\sqrt{3}T)$, where A (mm) represents the length along which the light shielding member covers the light diffusion sheet before shrinkage, T (mm) represents the thickness of the prism sheet, and S (mm) represents the amount of shrinkage of an end on the frame side of the light diffusion sheet in the planar direction of the light diffusion sheet. The backlight unit also satisfies the relationship given by the following expression: $E<D$, where D (mm) represents the distance between the end on the frame side of the light diffusion sheet before expansion and a frame and E (mm) represents the amount of expansion of the end on the frame side of the light diffusion sheet in the planar direction of the light diffusion sheet.

4 Claims, 4 Drawing Sheets

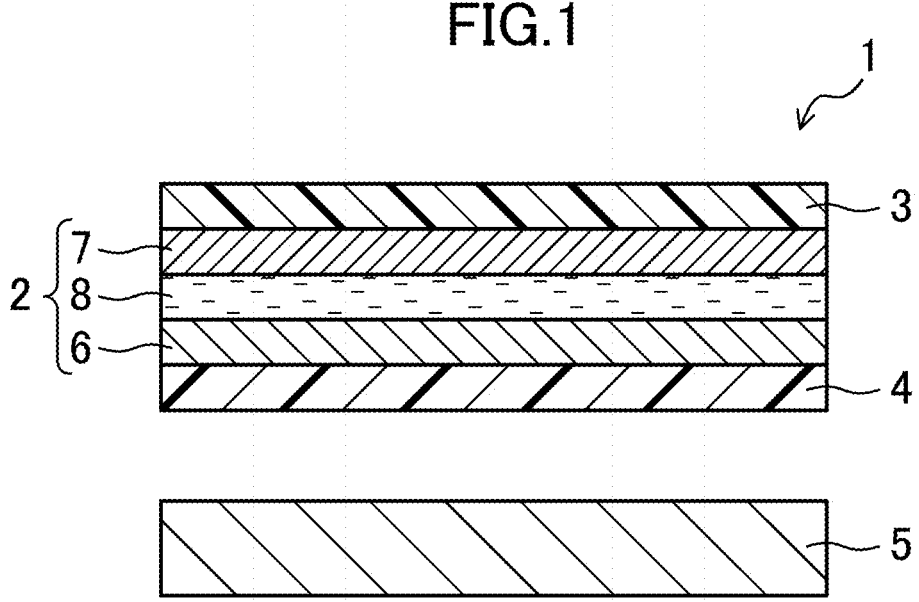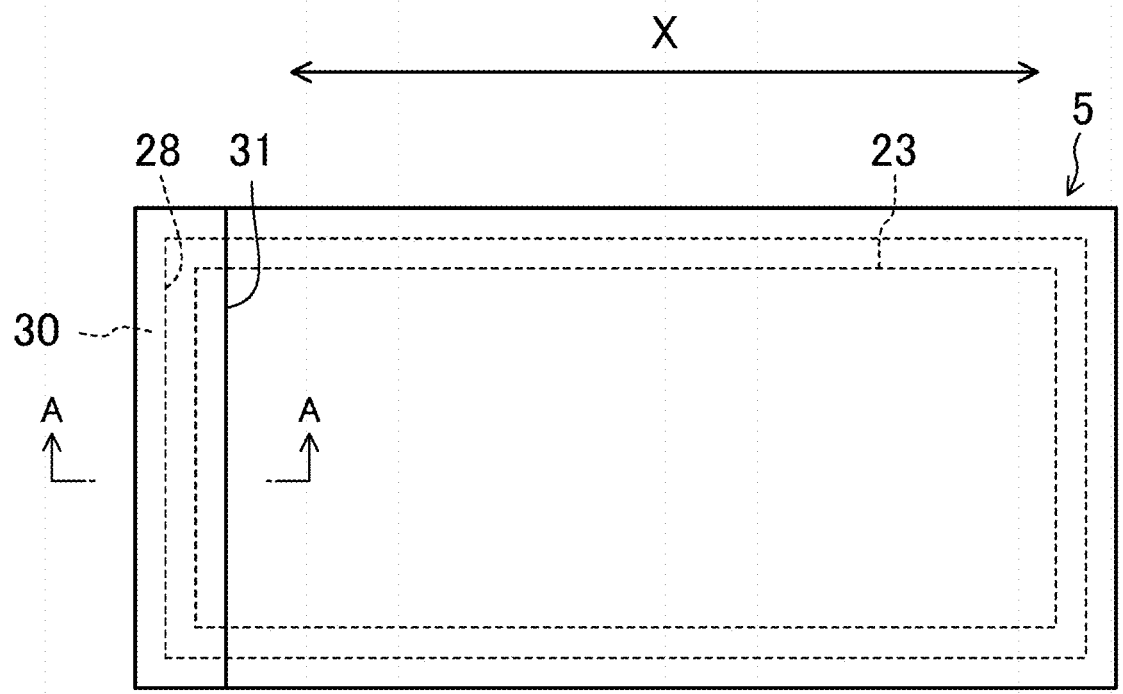

BACKLIGHT UNIT AND LIQUID CRYSTAL DISPLAY DEVICE

CROSS-REFERENCE TO RELATED APPLICATION

This application claims priority to Japanese Patent Application No. 2018-196838 filed on Oct. 18, 2018, the entire disclosure of which is incorporated by reference herein.

BACKGROUND

The present invention relates to backlight units and liquid crystal display devices.

In recent years, flat displays such as liquid crystal displays and plasma displays have been widely used as display devices because of their space saving design and high definition. Liquid crystal displays have been attracting attention because of their power saving properties and high definition and therefore have been developed.

Such a liquid crystal display (LCD) device is a non-light emitting display device including an LCD panel and a backlight unit disposed on the back side of the LCD panel. The LCD panel includes, e.g., a thin film transistor (TFT) substrate and a color filter (CF) substrate which are disposed so as to face each other, and a liquid crystal layer enclosed between the TFT substrate and the CF substrate. The CF substrate has, e.g., a colored layer of red, green, or blue at each sub-pixel forming pixels.

As the backlight unit, a backlight unit is disclosed which includes, e.g., a rectangular frame-shaped support frame made of a synthetic resin, a reflective sheet bonded to the back surface of the support frame, a light guide sheet that is a plurality of optical members disposed in the support frame, a light diffusion sheet, and a prism sheet, and a light source that emits light to be incident on the light guide sheet, and in which a light shielding tape is provided along the peripheral edge of the support frame (see, e.g., Japanese Unexamined Patent Publication No. 2017-187548).

SUMMARY

In such a backlight unit, the light diffusion sheet expands and shrinks in its planar direction due to heat from the light source and the environment in which the backlight unit is used, and such expansion and shrinkage result in light leakage and deflection (wrinkles) of the light diffusion sheet.

More specifically, the light diffusion sheet expands when the temperature rises due to heat from the light source, when the backlight unit is used in a high temperature, high humidity environment, etc., and the expanded light diffusion sheet comes into contact with the frame and is thus deflected.

Moreover, when the light diffusion sheet shrinks when cooled (e.g., cooled to room temperature) after expansion of the light diffusion sheet, a space is created as a result of the shrinkage of the light diffusion sheet. Accordingly, light leakage leaks through this space.

In recent years, backlight units for smartphones and notebook computers have been desired to have a narrow frame in order to achieve reduction in size. Such deflection of the light diffusion sheet and light leakage as described above tend to occur especially in the backlight units with a narrow frame.

The present invention was developed in view of such circumstances, and it is an object of the present invention to provide a backlight unit capable of preventing or reducing light leakage and of preventing or reducing deflection of a light diffusion sheet.

In order to achieve the above object, a backlight unit of the present invention includes: a light guide sheet that guides incident light beams toward a front side thereof; a light source that emits the light beams toward the light guide sheet; a light diffusion sheet superimposed on the front side of the light guide sheet; a prism sheet disposed on a front side of the light diffusion sheet; a frame accommodating the light guide sheet, the light source, the light diffusion sheet, and the prism sheet; and a light shielding member disposed on a front side of the prism sheet. The light shielding member is disposed so as to cover the prism sheet and the light diffusion sheet from an end on the frame side of the light diffusion sheet in a planar direction of the light diffusion sheet. The backlight unit satisfies a relationship as given by the following expression (1), where A (mm) represents a length along which the light shielding member covers the light diffusion sheet before shrinkage in the planar direction of the light diffusion sheet, T (mm) represents a thickness of the prism sheet 24, and S (mm) represents an amount of shrinkage of the end on the frame side of the light diffusion sheet in the planar direction of the light diffusion sheet. The backlight unit also satisfies a relationship as given by the following expression (2), where D (mm) represents a distance in the planar direction of the light diffusion sheet between the end on the frame side of the light diffusion sheet before expansion and the frame, and E (mm) represents an amount of expansion of the end on the frame side of the light diffusion sheet in the planar direction of the light diffusion sheet under one of the following conditions: at 85° C., at 65° C. with humidity of 95%, and at 85° C. with humidity of 85%

$$S<2(A-\sqrt{3}T) \quad (1)$$

$$E<D \quad (2).$$

According to the present invention, light leakage and deflection of the light diffusion sheet in the backlight unit are prevented or reduced.

BRIEF DESCRIPTION OF THE DRAWINGS

FIG. 1 is a sectional view of an LCD device according to an embodiment of the present invention.

FIG. 2 is a plan view of a backlight unit according to the embodiment of the present invention.

DETAILED DESCRIPTION

An embodiment of the present invention will be described in detail with reference to the drawings.

Figure 3:
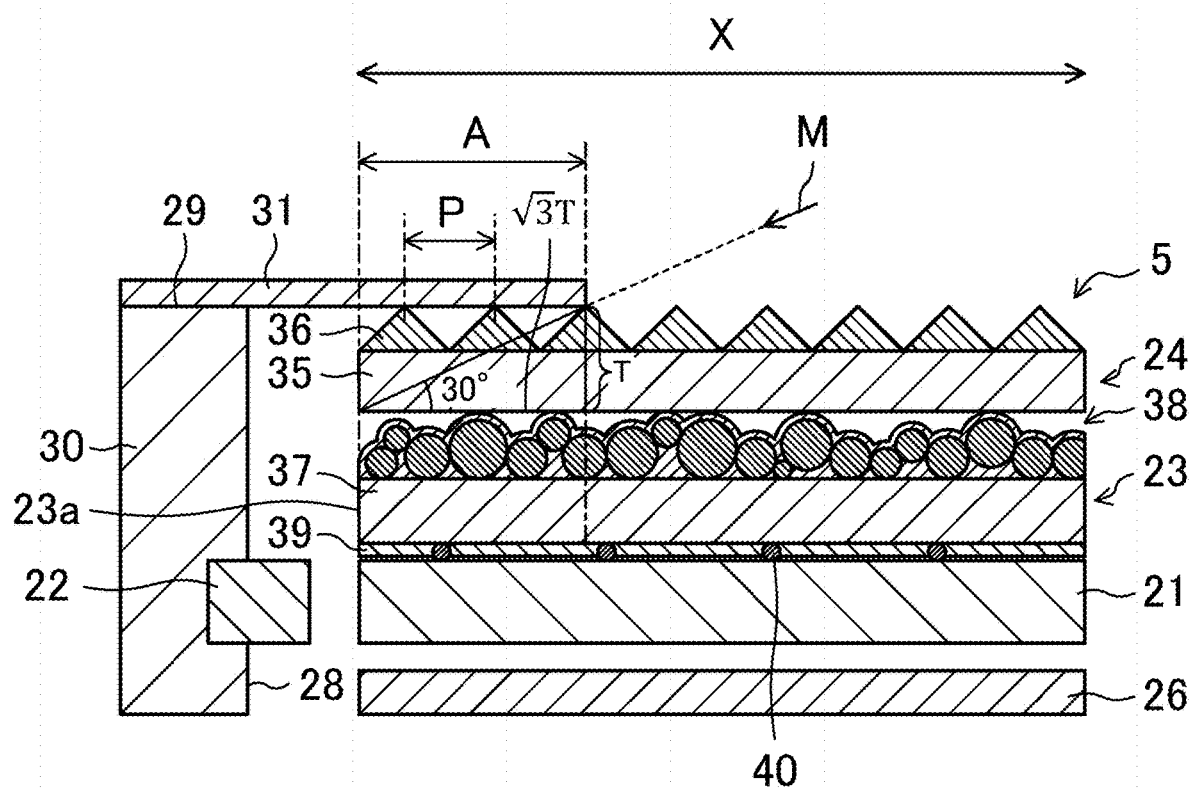
FIG. 3 is a sectional view of the backlight unit in the LCD device according to the embodiment of the present invention, taken along line A-A in FIG. 2.

FIG. 1 is a sectional view of an LCD device according to an embodiment of the present invention. FIG. 2 is a plan view of a backlight unit according to the embodiment of the present invention. FIG. 3 is a sectional view of a backlight in the LCD device according to the embodiment of the present invention, taken along line A-A in FIG. 2.

As shown in FIG. 1, an LCD device 1 includes an LCD panel 2, a first polarizer 3 (hereinafter sometimes simply referred to as the "polarizer 3"), a second polarizer 4 (hereinafter sometimes simply referred to as the "polarizer 4"), and a backlight unit 5. In the LCD panel 2, a plurality of pixels are arranged in a matrix. The first polarizer 3 is bonded to the front side of the LCD panel 2 (the upper side of the LCD panel 2 in the figure, the viewer's side of the LCD device 1). The second polarizer 4 is bonded to the back side of the LCD panel 2 (the rear side, the lower side in the figure, the opposite side of the LCD device 1 from the viewer's side). The backlight unit 5 is provided on the back side of the LCD panel 2.

As shown in FIG. 1, the LCD panel 2 includes a thin film transistor (TFT) substrate 6, a color filter (CF) substrate 7, a liquid crystal layer 8, and a sealant (not shown). The TFT substrate 6 is a first substrate, and the CF substrate 7 is a second substrate. The CF substrate 7 is disposed so as to face the TFT substrate 6. The liquid crystal layer 8 is interposed between the TFT substrate 6 and the CF substrate 7. The sealant is provided in a frame shape in order to bond the TFT substrate 6 and the CF substrate 7 and to enclose the liquid crystal layer 8 between the TFT substrate 6 and the CF substrate 7.

The TFT substrate 6 and the CF substrate 7 are in the shape of a rectangular plate. The LCD device 1 further includes a plurality of photo spacers (not shown) for controlling the thickness of the liquid crystal layer 8 (that is, the cell gap).

The TFT substrate 6 includes, e.g., an insulating substrate such as a glass substrate or a plastic substrate, a plurality of gate lines, a plurality of source lines, a plurality of TFTs, a protective film, a plurality of pixel electrodes, and an alignment film (all not shown). The plurality of gate lines extend parallel to each other on the insulating substrate. The plurality of source lines extend parallel to each other in a direction perpendicular to the gate lines. The plurality of TFTs are provided in each intersection of the gate and source lines. Namely, the plurality of TFTs are provided for each sub-pixel Pr, Pg, Pb. The protective film covers the TFTs. The plurality of pixel electrodes are arranged in a matrix on the protective film, and each pixel electrode is connected to a corresponding one of the TFTs. The alignment film covers the pixel electrodes.

The CF substrate 7 includes an insulating substrate such as a glass substrate or a plastic substrate, a common electrode formed on the insulating substrate, and an alignment film covering the common electrode (all not shown).

The liquid crystal layer 8 is made of a nematic liquid crystal material having electro-optical properties, etc.

Backlight Unit

As shown in FIGS. 2 to 3, the backlight unit 5 is an edge backlight unit and includes a light guide sheet 21, a light source 22, a light diffusion sheet 23, and a prism sheet 24. The light guide sheet 21 guides light beams incident from its end face toward the front side of the backlight unit 5. The light source 22 emits light beams toward the end face of the light guide sheet 21. The light diffusion sheet 23 is superimposed on the front side of the light guide sheet 21. The prism sheet 24 is disposed on the front side of the light diffusion sheet 23. The backlight unit 5 further includes a reflective sheet 26 disposed on the back side of the light guide sheet 21.

The light diffusion sheet 23 functions to collect light beams incident from its back side in the normal direction while diffusing the light beams (light beam collecting and diffusing function). The prism sheet 24 functions to refract light beams incident from its back side in the normal direction. The reflective sheet 26 functions to reflect light beams emitted from the back side of the light guide sheet 21 toward the front side of the backlight unit 5, namely back into the light guide sheet 21.

As shown in FIGS. 2 and 3, the backlight unit 5 further includes a frame 30 that surrounds and accommodates the reflective sheet 26, the light guide sheet 21, the light source 22, the light diffusion sheet 23, and the prism sheet 24.

Prism Sheet

The prism sheet 24 is disposed so as to face the polarizer 4. Since the prism sheet 24 is required to transmit light beams therethrough, it is mainly made of a transparent synthetic resin, particularly a colorless, transparent synthetic resin. The prism sheet 24 includes a base material layer 35 and a protrusion pattern comprised of a plurality of ridge prism units 36 formed on the surface of the base material layer 35. The ridge prism units 36 are formed in a stripe pattern on the surface of the surface of the base material layer 35. The ridge prism units 36 are in the shape of a triangular prism with their back surfaces in contact with the surface of the base material layer 35.

The minimum allowable thickness of the prism sheet 24 (height from the back surface of the base material layer 35 to the apex of the ridge prism unit 36) is preferably 35 μm, and more preferably 50 μm. The maximum allowable thickness of the prism sheet 24 is preferably 200 μm, and more preferably 180 μm.

The minimum allowable pitch P (see FIG. 3) of the ridge prism units 36 of the prism sheet 24 is preferably 12 μm, and more preferably 20 μm. The maximum allowable pitch P of the ridge prism units 36 of the prism sheet 24 is preferably 100 μm, and more preferably 60 μm.

The apex angle of the ridge prism units 36 is preferably 85° or more and 95° or less. The minimum allowable refractive index of the ridge prism units 36 is preferably 1.5, and more preferably 1.55. The maximum allowable refractive index of the ridge prism units 36 is preferably 1.7.

The prism sheet 24 may be either a combination of two prism sheets or a laminate of two prism sheets.

Light Diffusion Sheet

The light diffusion sheet 23 is disposed on the surface of the light guide sheet 21 and includes a base material layer 37, a light diffusion layer 38 formed on the front side of the base material layer 37, and an anti-sticking layer 39 formed on the back side of the base material layer 37.

Since the base material layer 37 of the light diffusion sheet 23 is required to transmit light beams therethrough, it is mainly made of a transparent synthetic resin, particularly a colorless, transparent synthetic resin. Examples of the main component of the base material layer 37 include, but not limited to, polyethylene terephthalate, polyethylene naphthalate, acrylic resins, polycarbonates, polystyrenes, polyolefins, cellulose acetates, weather-resistant vinyl chlorides, and polyimides.

The light diffusion layer 38 of the light diffusion sheet 23 includes a light diffusion material and a binder for the light diffusion material. The light diffusion material is particles having light diffusing properties and is roughly divided into two types, namely an inorganic filler and an organic filler.

Specific examples of the inorganic filler include silicas, aluminum hydroxides, aluminum oxides, zinc oxides, barium sulfide, magnesium silicates, and mixtures thereof. Specific examples of the organic filler include acrylic resins, acrylonitrile resins, polyurethanes, polyvinyl chlorides, polystyrenes, polyamides, polyacrylonitriles, and nylon.

The shape of the light diffusion material is not particularly limited. For example, the light diffusing material may be in the shape of a sphere, a cube, a needle, a rod, a spindle, a plate, a scale, a fiber, etc. Especially, the light diffusion material is preferably spherical beads with excellent light diffusing properties.

The anti-sticking layer 39 is made of a resin matrix with resin beads 40 dispersed therein. The resin beads 40 are sparsely dispersed on the back side of the base material layer 37. Since the resin beads 40 are sparsely dispersed, the anti-sticking layer 39 has a plurality of protrusions resulting from the presence of the resin beads 40 and flat portions where no resin bead 40 is present. The anti-sticking layer 39 is in contact with the light guide sheet 21 disposed on its back side only at the plurality of protrusions. Namely, not the entire back surface of the anti-sticking layer 39 contacts the light guide sheet 21. This configuration thus eliminates or reduces the possibility of sticking. Unevenness of brightness of the LCD device 1 is thus restrained.

Examples of the resin forming the anti-sticking layer 39 include, but not limited to, acrylic urethane resins, acrylic resins, acrylonitrile resins, polyurethanes, polyvinyl chlorides, polystyrenes, polyamides, and polyacrylonitriles.

Among these, in order to eliminate or reduce the possibility of bright spot defects due to the surface of the light guide sheet 21 being damaged by friction between the light diffusion sheet 23 and the light guide sheet 21, it is preferable to use an acrylic urethane resin to give the anti-sticking layer 39 flexibility. Acrylic urethane resins herein refer to acrylic resins having an acrylic skeleton and a urethane skeleton. For example, a resin crosslinked with an isocyanate resin and an acrylic polyol resin may be used.

Light Guide Sheet

The light guide sheet 21 is a sheet-like optical member that causes light beams emitted from the light source 22 to propagate therethrough and emits the light beams from its surface. The light guide sheet 21 may have a generally wedge-shaped section or may be generally in the shape of a flat plate.

Since the light guide sheet 21 is required to be translucent, it is mainly made of a transparent resin, particularly a colorless, transparent resin. Examples of the main component of the light guide sheet 21 include, but not limited to, polycarbonate resins having high transparency, high strength, etc. and synthetic resins such as acrylic resins having high transparency, high scratch resistance, etc. The main component of the light guide sheet 21 is preferably a polycarbonate resin. Polycarbonate resins have high transparency and a high refractive index. Accordingly, total reflection tends to occur at the interface with an air layer (a layer in the clearance between the light guide sheet 21 and the light diffusion sheet 23 disposed on the front side of the light guide sheet 21 and a layer in the clearance between the light guide sheet 21 and the reflective sheet 26 disposed on the back side of the light guide sheet 21), and the light guide sheet 21 thus efficiently causes light beams to propagate therethrough. Since polycarbonate resins are heat resistant, degradation etc. due to heat generated by the light source 22 is less likely to occur.

Light Source

The light source 22 is of an edge type. Specifically, the light source 22 is disposed such that its light emitting surface faces (or contacts) the end face of the light guide sheet 21, and the light source 22 emits light beams toward the end face of the light guide sheet 21. Various light sources can be used as the light source 22. For example, a light emitting diode (LED) may be used. Specifically, the light source 22 may be a plurality of LEDs arranged along the end face of the light guide sheet 21.

Reflective Sheet

Examples of the reflective sheet 26 include a white sheet made of a matrix resin such as polyester with a filler dispersed therein and a mirror sheet that is a film made of polyester etc. with a metal such as aluminum or silver deposited thereon for improved regular reflection.

Frame

The frame 30 is made of, e.g., plastic, and as shown in FIGS. 2 and 3, has is in the shape of a rectangular frame with a rectangular opening 28.

In the present embodiment, as shown in FIG. 3, the light source 22 located near the light guide sheet 21 so as to face the end face of the light guide sheet 21 is mounted in a part of the frame 30.

Light Shielding Member

In the present embodiment, as shown in FIGS. 2 and 3, a light shielding member 31 is disposed on an upper surface 29 of the frame 30. The light shielding member 31 serves to prevent or reduce backlight leakage through the end of the backlight unit 5. The light shielding member 31 is, e.g., a tape having light shielding properties, etc.

The light shielding member 31 has an adhesive layer (not shown) on its back surface. The light shielding member 31 is bonded to the upper surface 29 of the frame 30 and the prism sheet 24 via the adhesive layer.

As shown in FIG. 3, the light shielding member 31 extends beyond the inner end of the upper surface 29 of the frame 30 toward above the prism sheet 24. The light shielding member 31 is thus disposed on the front side of the prism sheet 24.

More specifically, the light shielding member 31 covers the prism sheet 24 and the light diffusion sheet 23 from an end 23a on the frame 30 side of the light diffusion sheet 23 in a planar direction (longitudinal direction) X of the light diffusion sheet 23. As shown in FIG. 3, A (mm) represents the length along which the light shielding member 31 covers the prism sheet 24 and the light diffusion sheet 23 from the end 23a on the frame 30 side of the light diffusion sheet 23.

As described above, in the conventional backlight unit, the light diffusion sheet expands and shrinks in its planar direction due to heat from the light source and the environment in which the backlight unit is used, and such expansion and shrinkage result in light leakage and deflection of the light diffusion sheet.

In view of this, in order to prevent or reduce light leakage and deflection of the light diffusion sheet, the inventors found the relationship among the length A along which the light shielding member 31 covers the light diffusion sheet 23 in the planar direction of the prism sheet 24 (or the light diffusion sheet 23), the amount of shrinkage of the light diffusion sheet 23, and the thickness of the prism sheet 24, and the relationship between the distance between the light diffusion sheet 23 and the frame 30 and the amount of expansion of the light diffusion sheet 23.

More specifically, the backlight unit 5 of the present invention satisfies the relationship as given by the following expression (3), where, as shown in FIG. 3, A (mm) represents the length along which the light shielding member 31 covers the light diffusion sheet 23 before shrinkage in the planar direction X of the light diffusion sheet 23 (i.e., the longitudinal direction of the light diffusion sheet 23), T (mm) represents the thickness of the prism sheet 24, and S (mm) (see FIG. 4) represents the amount of shrinkage of the end 23a on the frame 30 side of the light diffusion sheet 23 in the planar direction X of the light diffusion sheet 23 (i.e., the displacement of the end 23a on the frame 30 side of the light diffusion sheet 23 from the end 23a located before shrinkage as shown in FIG. 3).

$$S<2(A-\sqrt{3}T) \quad (3)$$

Figure 4:
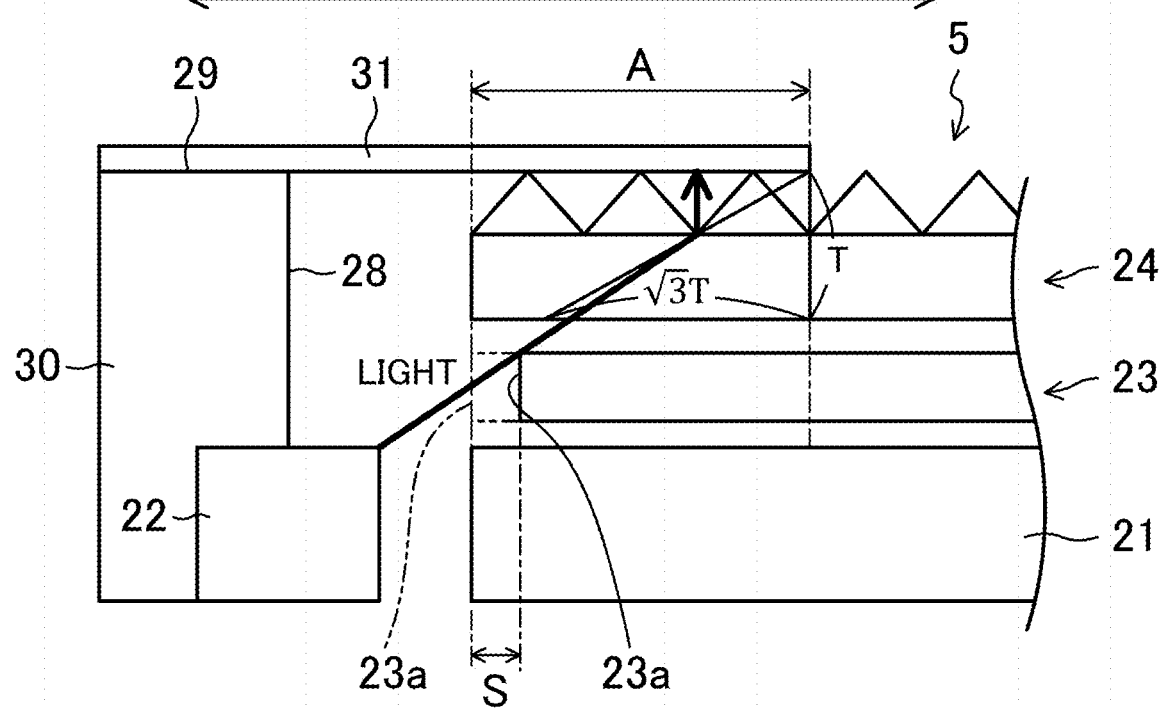
FIG. 4 is a schematic diagram illustrating how light leakage is prevented or reduced in the backlight unit according to the embodiment of the present invention.

As shown in FIG. 4, in the case where the amount of shrinkage S is set in this range, the light shielding member 31 reliably blocks light incident on the prism sheet 24 without passing through the light diffusion sheet 23 (i.e., light incident on the prism sheet 24 through a space created as a result of shrinkage of the light diffusion sheet 23) even when the light diffusion sheet 23 shrinks from the state shown in FIG. 3. This configuration thus prevents or reduces light leakage.

Figure 5:
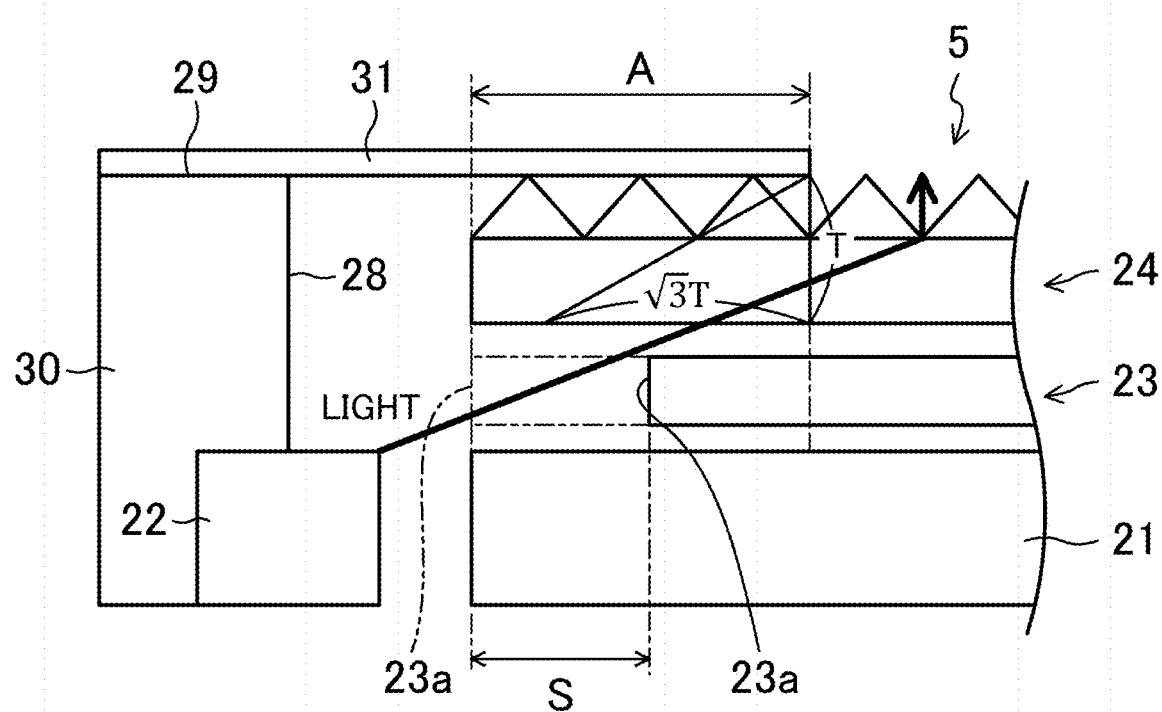
FIG. 5 is a schematic diagram illustrating how light leakage occurs in the backlight unit.

In other words, when the relationship shown in FIG. 5 is satisfied (i.e., when S≥2 (A−√3T) is satisfied) for the amount of shrinkage S (mm) of the light diffusion sheet 23, the length A (mm) along which the light shielding member 31 covers the light diffusion sheet 23, and the thickness T (mm) of the prism sheet 24, the light shielding member 31 does not block light incident on the prism sheet 24 without passing through the light diffusion sheet 23 (i.e., light incident on the prism sheet 24 through a space created as a result of shrinkage of the light diffusion sheet 23), and therefore light leakage occurs.

As in the backlight unit 5 according to the embodiment of the present invention, light leakage is reliably prevented or reduced as shown in FIG. 4 by setting the amount of shrinkage S so as to satisfy the relationship given by the above expression (3).

Figure 6:
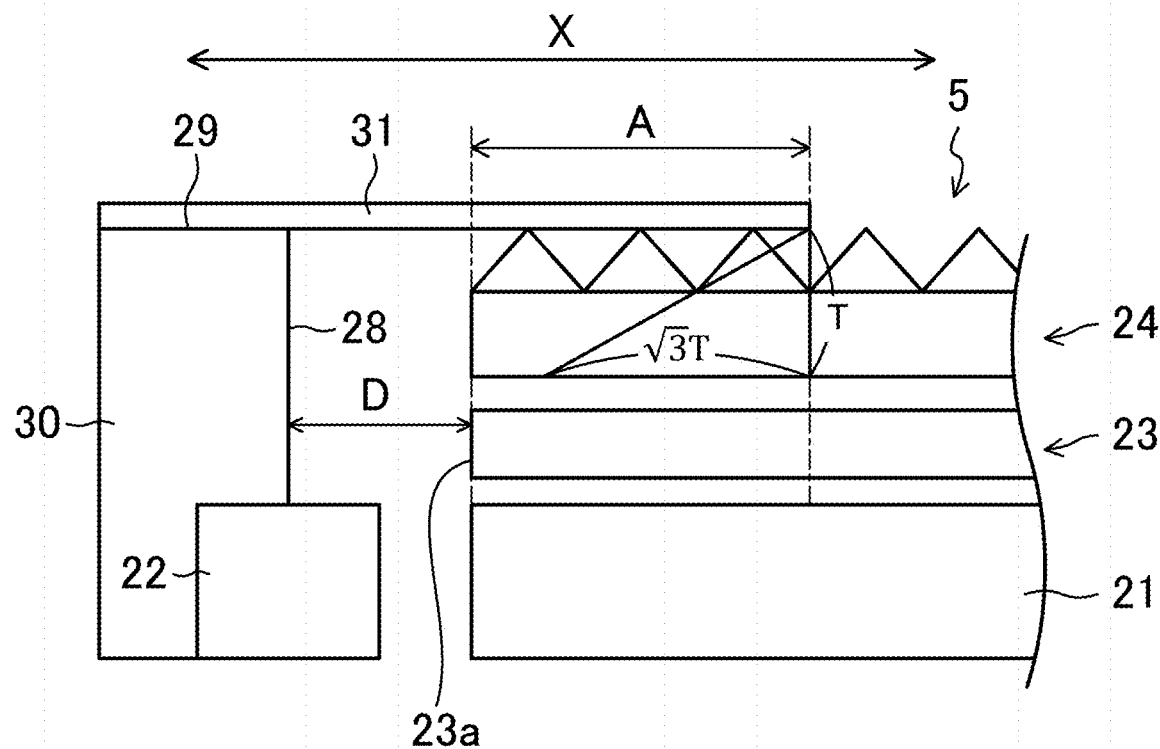
FIG. 6 is a schematic diagram illustrating how deflection of a light diffusion sheet is prevented or reduced in the backlight unit according to the embodiment of the present invention.
Figure 7:
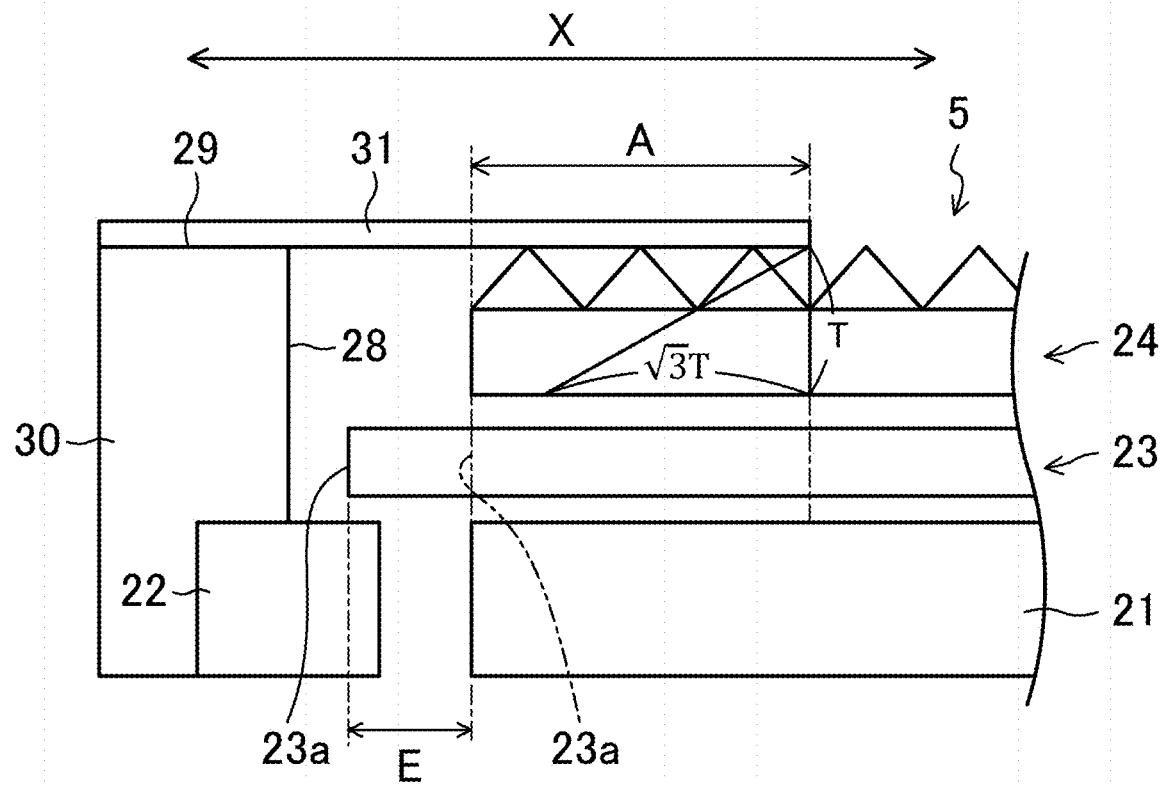
FIG. 7 is a schematic diagram illustrating how deflection of the light diffusion sheet is prevented or reduced in the backlight unit according to the embodiment of the present invention.

The backlight unit 5 of the present invention also satisfies the relationship as given by the following expression (4), where D (mm) (see FIG. 6) represents the distance in the planar direction X of the light diffusion sheet 23 between the end 23a on the frame 30 side of the light diffusion sheet 23 before expansion and the frame 30 (i.e., the edge of the opening 28 of the flame 30), and E (mm) (see FIG. 7) represents the amount of expansion of the end 23a on the frame 30 side of the light diffusion sheet 23 in the planar direction X of the light diffusion sheet 23 (i.e., the displacement of the end 23a on the frame 30 side of the light diffusion sheet 23 from the end 23a located before expansion as shown in FIG. 6) under one of the following three conditions: at 85° C., at 65° C. with humidity of 95%, and at 85° C. with humidity of 85%.

$$E<D \quad (4)$$

In the case where the amount of expansion E is set in this range, contact between the end on the frame 30 side of the light diffusion sheet 23 and the frame 30 is avoided. Deflection of the light diffusion sheet 23 is thus prevented.

EXAMPLES

The present invention will be described based on examples. The present invention is not limited to these examples, and these examples may be modified or altered without departing from the sprit and scope of the invention. Such modifications and alterations are not excluded from the scope of the invention.

Examples 1 to 4 and Comparative Examples 1 to 5

Production of Backlight Unit

First, an edge backlight unit shown in FIG. 3 was prepared. More specifically, a reflective sheet, a light guide sheet (produced by 3M Japan Limited, trade name: ESR), a light diffusion sheet, and a prism sheet (produced by 3M Japan Limited, trade name: ASOC-3) were sequentially stacked. The reflective sheet, the light guide sheet, the light diffusion sheet, the prism sheet, and a light source were surrounded and accommodated by a frame (produced by Sankyo Seiko Science & Technology Ltd., length: 5.6 inches). The light guide sheet is mainly made of an aromatic polycarbonate. The light diffusion sheet is comprised of a base material, such as a polyethylene terephthalate shown in Table 1, with its surface coated with a coating material. The coating material is an acrylic urethane resin with acrylic beads mixed therein. The light source is a light emitting diode (produced by NICHIA CORPORATION, trade name: NSSW304G). A light shielding sheet (produced by TERAOKA SEISAKUSHO CO., LTD., trade name: 704 A 0.05 Black HF) was used as a light shielding member, and the frame and the prism sheet were fixed by this light shielding member as shown in FIG. 3.

The distance D between the end on the frame side of the light diffusion sheet before expansion and the frame was set to 0.110 mm, and the length A along which the light shielding member covers the light diffusion sheet before shrinkage was set to 0.260 mm.

The light diffusion sheet has a length of 138 mm and a width of 70 mm, and the prism sheet has a thickness of 0.098 mm (i.e., √3T≈0.170).

Calculation of Shrinkage and Expansion of Light Diffusion Sheet

Next, an environmental test (a test in which a sample is left to stand for 120 hours at 85° C. and then left to stand for 2 hours at 25° C. with humidity of 50%) was conducted on the produced backlight unit. The length in the longitudinal direction X of the light diffusion sheet was then measured (at two positions) using "SD-45B" produced by Mitutoyo Corporation, and the amount of shrinkage and the amount of expansion of the light diffusion sheet were calculated based on the following expression (5).

This calculation was repeated three times, and their average values were calculated as the amount of shrinkage and the amount of expansion. In the following expression (5), a positive value represents the amount of expansion, and a negative value represents the amount of shrinkage. The results are shown in Table 1.

Amount of shrinkage (amount of expansion) (mm)=length (mm) of light diffusion sheet after environmental test−length (mm) of light diffusion sheet before environmental test (5)

Evaluation of Light Leakage

Thereafter, the light source of the backlight unit after the environmental test was turned on. The backlight unit was then observed from the opposing side to the light source at an angle of 30° with respect to the plane of the prism sheet (in the direction of arrow M in FIG. 3) and checked for light leakage. The results are shown in Table 1.

Evaluation of Deflection of Light Diffusion Sheet

Subsequently, the light diffusion sheet was taken out from the backlight unit and checked for deflection. The light diffusion sheet was checked for deflection by placing the light diffusion sheet alone on a smooth glass plate and visually observing the light diffusion sheet from the side under a fluorescent lamp. The results are shown in Table 1.

Examples 5 to 10 and Comparative Examples 6 to 8

Calculation of the amount of shrinkage and the amount of expansion of the light diffusion sheet, evaluation of light leakage, and evaluation of deflection of the light diffusion sheet were made in a manner similar to that of Examples 1 to 4 and Comparative Examples 1 to 5 except that the conditions for the environmental test conducted to calculate the amount of shrinkage and the amount of expansion of the light diffusion sheet were changed (i.e., the backlight unit was left to stand for 120 hours at 65° C. with humidity of 95% and then left to stand for 2 hours at 25° C. with humidity of 50%). The results are shown in Table 2.

Examples 11 to 16 and Comparative Examples 9 to 11

Calculation of the amount of shrinkage and the amount of expansion of the light diffusion sheet, evaluation of light leakage, and evaluation of deflection of the light diffusion sheet were made in a manner similar to that of Examples 1 to 4 and Comparative Examples 1 to 5 except that the conditions for the environmental test conducted to calculate the amount of shrinkage and the amount of expansion of the light diffusion sheet were changed (i.e., the backlight unit was left to stand for 120 hours at 85° C. with humidity of 85% and then left to stand for 2 hours at 25° C. with humidity of 50%). The results are shown in Table 3.

TABLE 1

| $(A - \sqrt{3T}) \times 2$ | Light Leakage | Amount of Expansion E of Light Diffusion Sheet After Test (mm) | Distance D (mm) | Deflection |
|---|---|---|---|---|
| 0.181 | No | −0.063 | 0.110 | No |
| 0.181 | No | −0.074 | 0.110 | No |
| 0.181 | No | −0.143 | 0.110 | No |
| 0.181 | No | −0.121 | 0.110 | No |
| 0.181 | Yes | −0.342 | 0.110 | No |
| 0.181 | Yes | −0.229 | 0.110 | No |
| 0.181 | Yes | −0.614 | 0.110 | No |
| 0.181 | Yes | −1.266 | 0.110 | No |
| 0.181 | Yes | −0.195 | 0.110 | No |

| | Environmental Test Conditions | Base Material Layer of Light Diffusion Sheet | Amount of Shrinkage S of Light Diffusion Sheet After Test (mm) |
|---|---|---|---|
| Example 1 | 85° C. 120 hr | Annealed PET | 0.063 |
| Example 2 | 85° C. 120 hr | Polyimide | 0.074 |
| Example 3 | 85° C. 120 hr | PET | 0.143 |
| Example 4 | 85° C. 120 hr | Modified Polycarbonate | 0.121 |
| Comparative Example 1 | 85° C. 120 hr | Commercially Available PET (A4300) | 0.342 |
| Comparative Example 2 | 85° C. 120 hr | Stretched PET | 0.229 |
| Comparative Example 3 | 85° C. 120 hr | Stretched PET | 0.614 |
| Comparative Example 4 | 85° C. 120 hr | OPP Film | 1.266 |
| Comparative Example 5 | 85° C. 120 hr | Acrylic Film | 0.195 |

TABLE 2

| | Environmental Test Conditions | Base Material Layer of Light Diffusion Sheet | Amount of Shrinkage S of Light Diffusion Sheet After Test (mm) | $(A - \sqrt{3T}) \times 2$ | Light Leakage | Amount of Expansion E of Light Diffusion Sheet After Test (mm) | Distance D (mm) | Deflection |
|---|---|---|---|---|---|---|---|---|
| Example 5 | 65° C./95% RH, 120 hr | Annealed PET | −0.060 | 0.181 | No | 0.060 | 0.110 | No |
| Example 6 | 65° C./95% RH, 120 hr | Polyimide | −0.068 | 0.181 | No | 0.068 | 0.110 | No |
| Example 7 | 65° C./95% RH, 120 hr | PET | −0.008 | 0.181 | No | 0.008 | 0.110 | No |
| Example 8 | 65° C./95% RH, 120 hr | Commercially Available PET (A4300) | −0.023 | 0.181 | No | 0.023 | 0.110 | No |
| Example 9 | 65° C./95% RH, 120 hr | Stretched PET | 0.045 | 0.181 | No | −0.045 | 0.110 | No |
| Example 10 | 65° C./95% RH, 120 hr | Stretched PET | 0.151 | 0.181 | No | −0.151 | 0.110 | No |
| Comparative Example 6 | 65° C./95% RH, 120 hr | Modified Polycarbonate | −0.158 | 0.181 | No | 0.158 | 0.110 | Yes |
| Comparative Example 7 | 65° C./95% RH, 120 hr | Acrylic Film | −0.266 | 0.181 | No | 0.226 | 0.110 | Yes |
| Comparative Example 8 | 65° C./95% RH, 120 hr | OPP Film | 0.393 | 0.181 | Yes | −0.393 | 0.110 | No |

TABLE 3

| | Environmental Test Conditions | Base Material Layer of Light Diffusion Sheet | Amount of Shrinkage S of Light Diffusion Sheet After Test (mm) | $(A - \sqrt{3T}) \times 2$ | Light Leakage | Amount of Expansion E of Light Diffusion Sheet After Test (mm) | Distance D (mm) | Deflection |
|---|---|---|---|---|---|---|---|---|
| Example 11 | 85° C./85% RH, 120 hr | Annealed PET | −0.068 | 0.181 | No | 0.068 | 0.110 | No |
| Example 12 | 85° C./85% RH, 120 hr | Polyimide | −0.008 | 0.181 | No | 0.008 | 0.110 | No |
| Example 13 | 85° C./85% RH, 120 hr | PET Film | −0.015 | 0.181 | No | 0.015 | 0.110 | No |

TABLE 3-continued

|  | Environmental Test Conditions | Base Material Layer of Light Diffusion Sheet | Amount of Shrinkage S of Light Diffusion Sheet After Test (mm) | (A − √3T) × 2 | Light Leakage | Amount of Expansion E of Light Diffusion Sheet After Test (mm) | Distance D (mm) | Deflection |
|---|---|---|---|---|---|---|---|---|
| Example 14 | 85° C./85% RH, 120 hr | Commercially Available PET (A4300) | −0.008 | 0.181 | No | 0.008 | 0.110 | No |
| Example 15 | 85° C./85% RH, 120 hr | Stretched PET | 0.030 | 0.181 | No | −0.030 | 0.110 | No |
| Example 16 | 85° C./85% RH, 120 hr | Modified Polycarbonate | 0.113 | 0.181 | No | −0.113 | 0.110 | No |
| Comparative Example 9 | 85° C./85% RH, 120 hr | Acrylic Film | −0.143 | 0.181 | No | 0.143 | 0.110 | Yes |
| Comparative Example 10 | 85° C./85% RH, 120 hr | Stretched PET | 0.249 | 0.181 | Yes | −0.249 | 0.110 | No |
| Comparative Example 11 | 85° C./85% RH, 120 hr | OPP Film | 0.656 | 0.181 | Yes | −0.656 | 0.110 | No |

The results in Tables 1 to 3 show that light leakage was prevented when the amount of shrinkage S (mm) of the end on the frame side of the light diffusion sheet, the length A (mm) along which the light shielding member covers the light diffusion sheet before shrinkage, and the thickness T (mm) of the prism sheet satisfy the relationship as given by the above expression (3) (namely Examples 1 to 16).

The results in Tables 1 to 3 also show that deflection of the light diffusion sheet was prevented when the distance D (mm) between the end on the frame side of the light diffusion sheet before expansion and the frame and the amount of expansion E (mm) of the end on the frame side of the light diffusion sheet satisfy the relationship as given by the above expression (4) (namely Examples 1 to 16).

In Comparative Examples 1 to 5, 8, 10, and 11, light leakage occurred as the relationship of S≥2(A−√3T) is satisfied.

In Comparative Examples 6, 7, and 9, deflection of the light diffusion sheet occurred as the relationship of E≥D is satisfied.

As described above, the present invention is particularly useful for backlights for LCD devices.

What is claimed is:

1. A backlight unit, comprising:
    a light guide sheet that guides incident light beams toward a front side thereof;
    a light source that emits the light beams toward the light guide sheet;
    a light diffusion sheet superimposed on the front side of the light guide sheet;
    a prism sheet disposed on a front side of the light diffusion sheet;
    a frame accommodating the light guide sheet, the light source, the light diffusion sheet, and the prism sheet; and
    a light shielding member disposed on a front side of the prism sheet, wherein
    the light shielding member is disposed so as to cover the prism sheet and the light diffusion sheet from an end on the frame side of the light diffusion sheet in a planar direction of the light diffusion sheet,
    the backlight unit satisfies a relationship as given by the following expression (1), $$S < 2(A - \sqrt{3}T) \quad (1)$$

where A (mm) represents a length along which the light shielding member covers the light diffusion sheet before shrinkage in the planar direction of the light diffusion sheet, T (mm) represents a thickness of the prism sheet, and S (mm) represents an amount of shrinkage of the end on the frame side of the light diffusion sheet in the planar direction of the light diffusion sheet, and the backlight unit satisfies a relationship as given by the following expression (2), $$E < D \quad (2)$$

where D (mm) represents a distance in the planar direction of the light diffusion sheet between the end on the frame side of the light diffusion sheet before expansion and the frame and E (mm) represents an amount of expansion of the end on the frame side of the light diffusion sheet in the planar direction of the light diffusion sheet under one of the following conditions: at 85° C., at 65° C. with humidity of 95%, and at 85° C. with humidity of 85%.

2. The backlight unit of claim 1, wherein
    the light source emits the light beams toward an end face of the light guide sheet.

3. The backlight unit of claim 1, wherein
    the light source emits the light beams toward a back surface of the light guide sheet.

4. A liquid crystal display device, comprising:
    a liquid crystal display panel; and
    the backlight unit of claim 1 disposed on a back side of the liquid crystal display panel.

* * * * *